United States Patent [19]

Davis

[11] Patent Number: 4,509,375
[45] Date of Patent: Apr. 9, 1985

[54] TORQUE METER

[76] Inventor: Toby L. Davis, 3406 Karen Ct., Arlington, Tex. 76014

[21] Appl. No.: 428,303

[22] Filed: Sep. 29, 1982

[51] Int. Cl.³ .............................................. G01L 3/04
[52] U.S. Cl. .................................................. 73/862.32
[58] Field of Search ............ 73/862.32, 862.33, 862.19

[56] References Cited

U.S. PATENT DOCUMENTS

| | | | |
|---|---|---|---|
| 839,803 | 1/1907 | Amsler | 73/862.32 |
| 1,204,292 | 11/1916 | McCormick | 73/862.32 |
| 2,230,049 | 1/1941 | Klamp | 73/862.32 |
| 2,260,036 | 10/1941 | Kuehni | 73/862.32 |
| 3,104,544 | 9/1963 | Guiot | 73/862.32 X |
| 3,683,685 | 8/1972 | Viegelahn | 73/862.32 |
| 4,193,720 | 3/1980 | Machida | 73/862.33 X |

FOREIGN PATENT DOCUMENTS 341420  8/1904  France ............. 73/862.32

Primary Examiner—James L. Rowland
Assistant Examiner—Brian R. Tumm
Attorney, Agent, or Firm—Arthur F. Zobal

[57] ABSTRACT

A torque meter has an input shaft and an output shaft with a torque sensitive portion connecting the two shafts together. An axial movable element has one end connected to one shaft such that the axial movable element may move axially. Rollers coupled to the other shaft engages the axial movable element for axially moving the axial movable element when torsion of said torque sensitive portion occurs upon the application of torque to one of the shafts. A measuring device is provided for measuring the axial displacement of the axial movable element. The two shafts and the torque sensitive portion are integral with each other defining a single element. The axial movable element is a tubular member surrounding the torque sensitive portion. In another embodiment, one shaft has an aperture formed therethrough and the torque sensitive portion is a tubular member which connects the two shafts together. The axial movable element is located within the aperture and within the tubular member.

3 Claims, 13 Drawing Figures

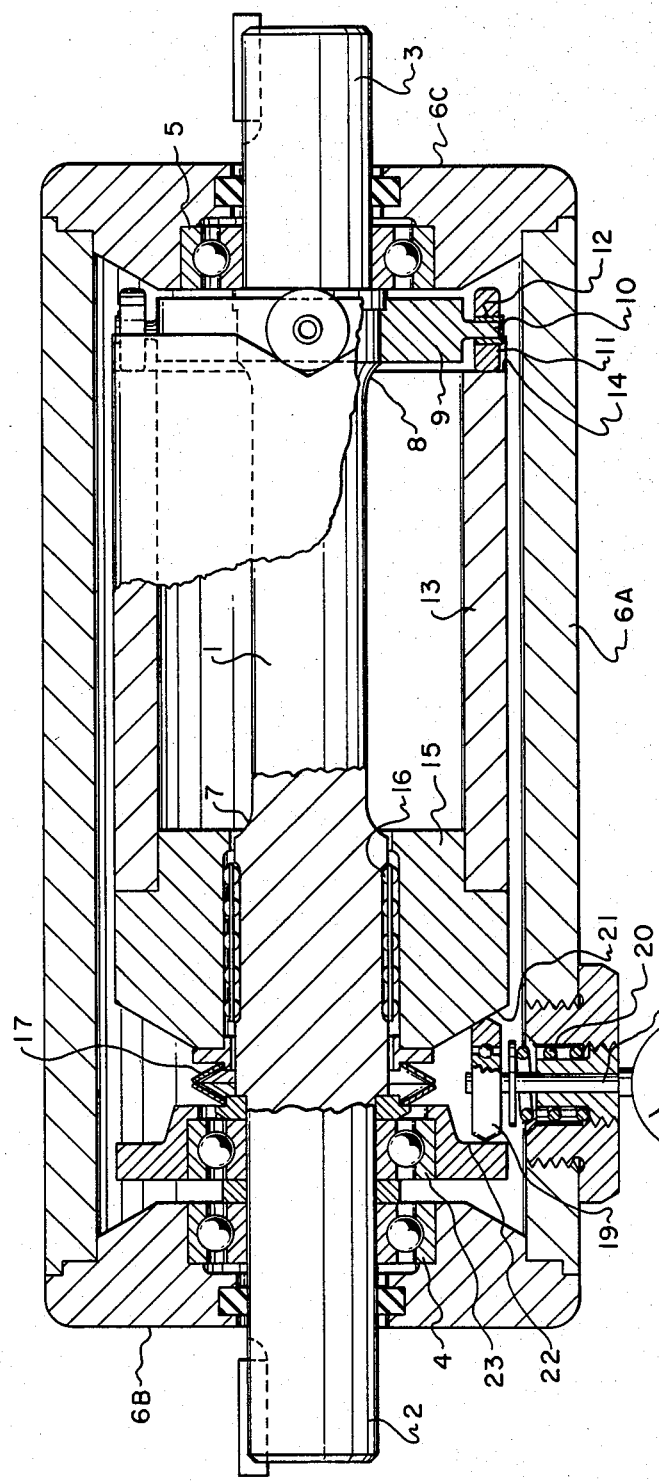
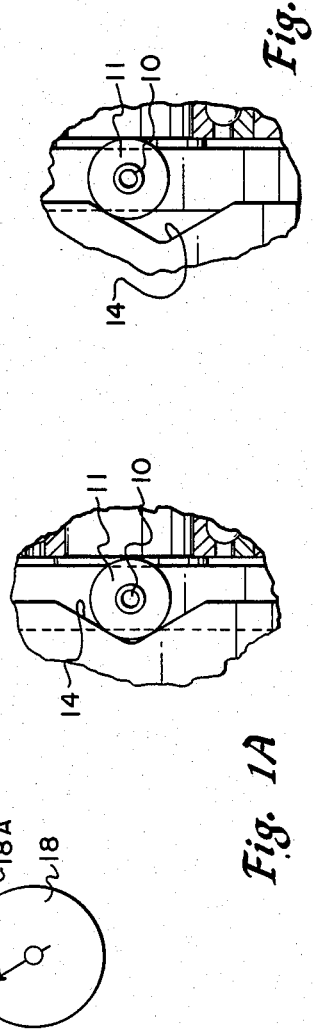
Fig. 1
Fig. 1A
Fig. 1B

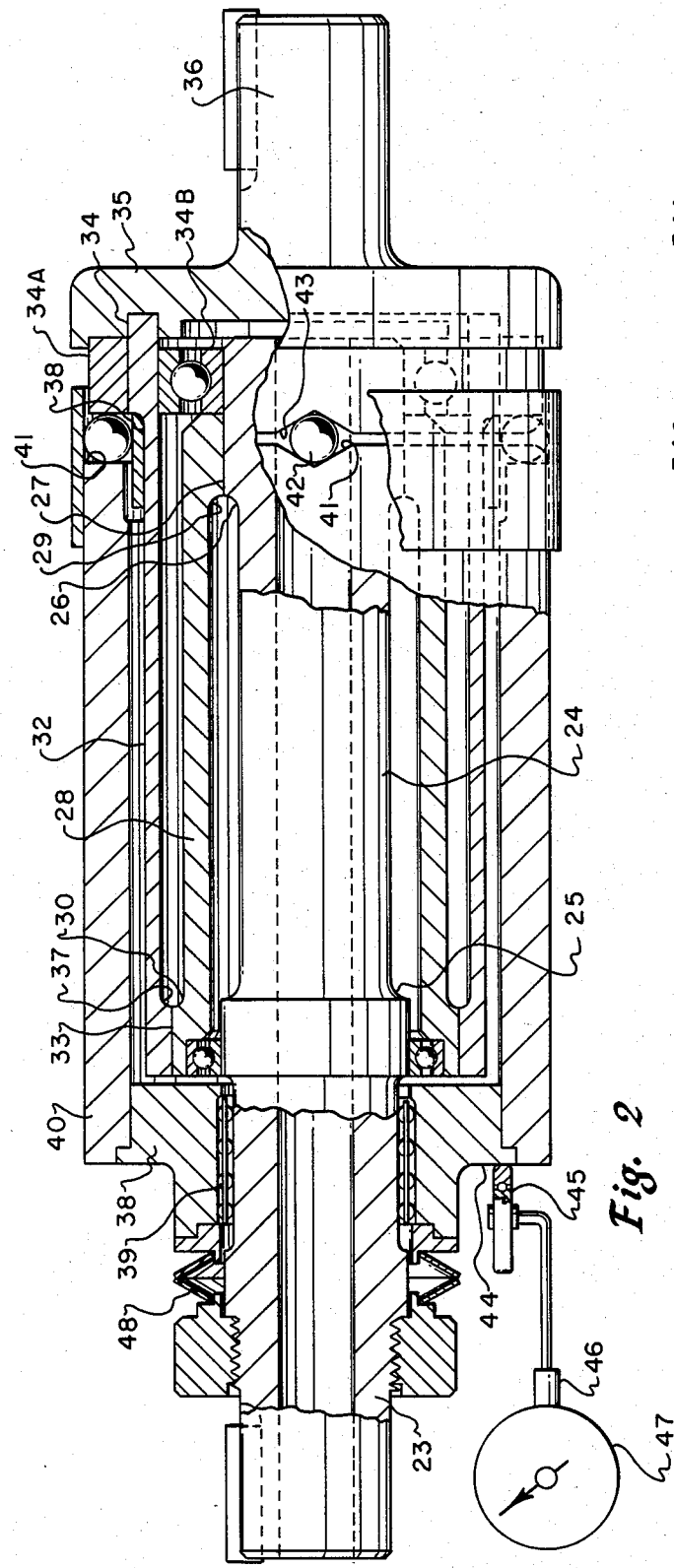
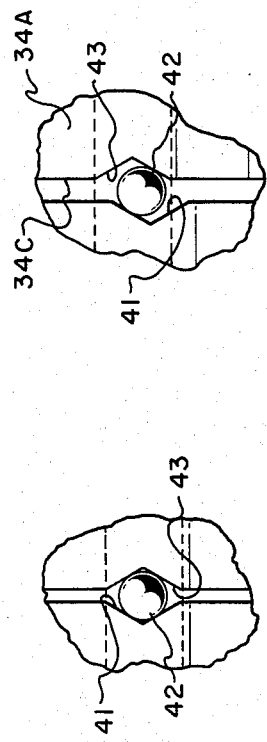
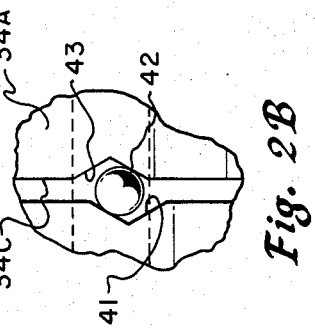
Fig. 2
Fig. 2A
Fig. 2B

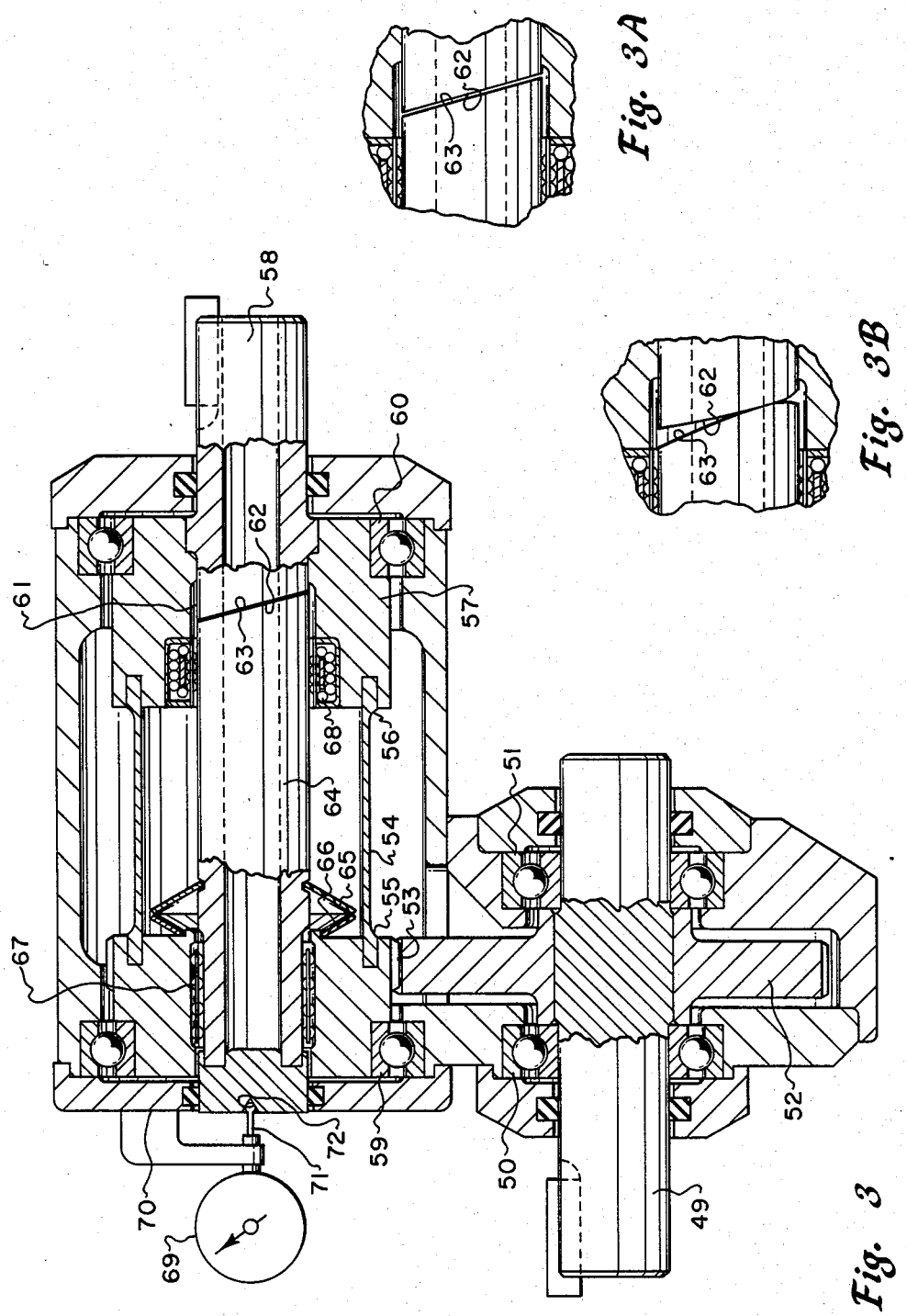

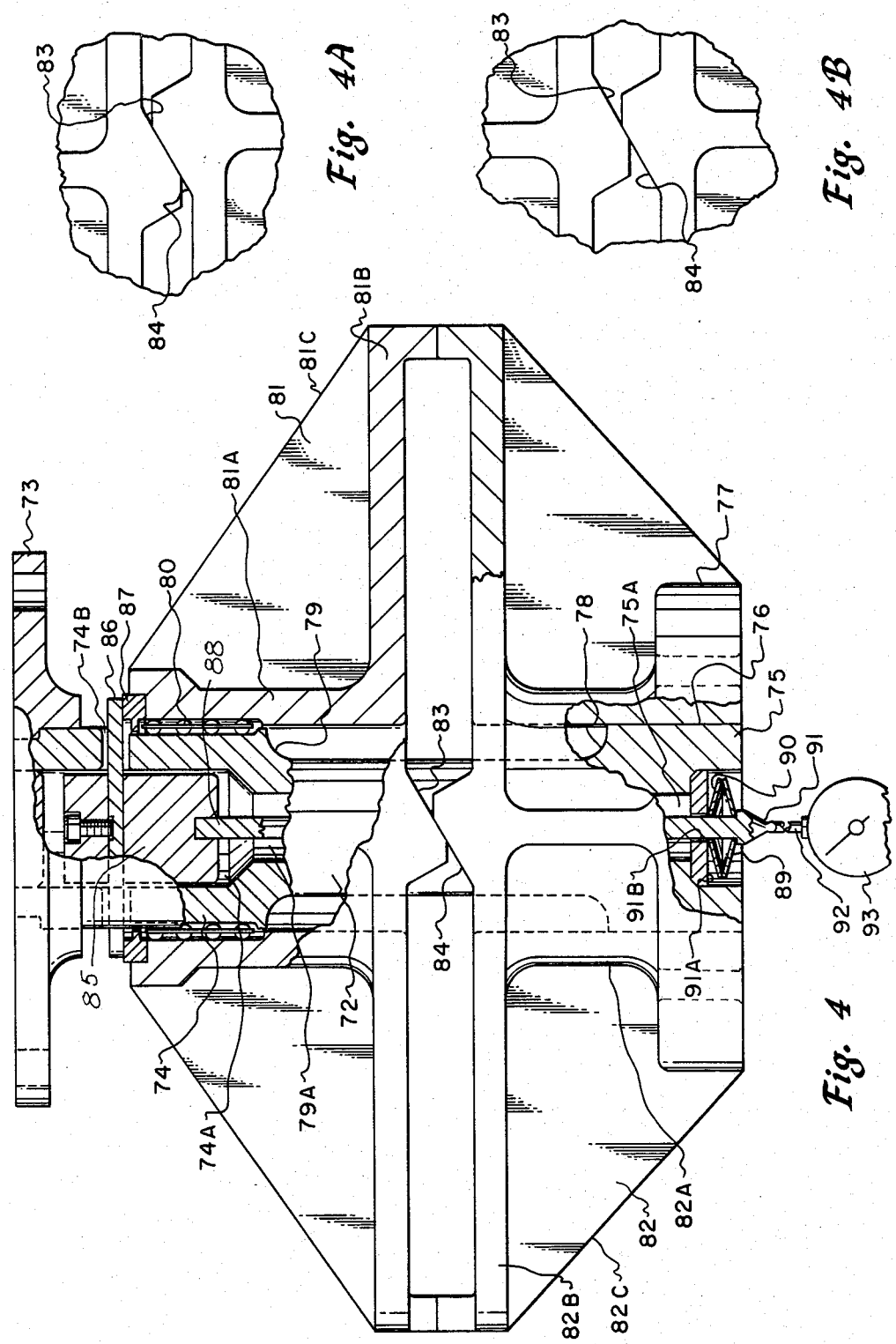

TORQUE METER

BACKGROUND OF THE INVENTION

1. Field of the Invention

The present invention is directed to a torque meter for measuring torque in rotating shafts, twisting devices, rotating and nonrotating equipment, etc.

2. Description of the Prior Art

U.S. Pat. No. 3,104,544 discloses one type of torque measuring device.

SUMMARY OF THE INVENTION

It is an object of the present invention to provide a new, and useful apparatus for accurately measuring torque during rotating and nonrotating conditions and which can be used in different modes.

The apparatus comprises an input shaft and an output shaft with a torque sensitive means connecting the two shafts together. An axial movable means has one end connected to one of said shafts such that the axial movable means may move axially. Means coupled to the other shaft engages the axial movable means for axially moving the axial movable means when torsion of said torque sensitive means occurs upon the application of torque to one of said shafts. Means is provided for measuring the axial displacement of said axial movable means.

In one embodiment, the two shafts and the torque sensitive means are integral with each other defining a single element. The axial movable means surrounds the torque sensitive means.

In another embodiment, one shaft has an aperture formed therethrough and the torque sensitive means is a tubular means which connects the two shafts together. The axial movable means is located within said aperture and within said torque sensitive means.

In still another embodiment, one shaft has an aperture formed therethrough and the torque sensitive means is a tubular means which connects the two shafts together. A first cam means is coupled to the other shaft for axial movement relative to said other shaft. A second cam means is connected to said one shaft for causing said first cam means to move axially when torsion of the torque sensitive means occurs upon the application of torque to one of said shafts. An axial movable means is located within said aperture and within said torque sensitive means. Means is provided for coupling said first cam means to said axial movable means for causing said axial movable means to move axially when said first cam means moves axially.

BRIEF DESCRIPTION OF THE DRAWINGS

FIG. 1 is a partial cross sectional view of one embodiment of the torque meter of the present invention.

FIGS. 1A and 1B illustrate the rollers of the torque meter of FIG. 1 moving its sleeve axially.

FIG. 2 is another embodiment of the torque meter of the present invention.

FIGS. 2A and 2B illustrate the rollers of the torque meter of FIG. 2 moving its sleeve axially.

FIG. 3 is a third embodiment of the torque meter of the present invention.

FIGS. 3A and 3B illustrate a shaft of the torque meter of FIG. 3 moving an interior member axially.

FIG. 4 is a fourth embodiment of the torque meter of the present invention.

FIGS. 4A and 4B illustrate a cam of the torque meter of FIG. 4 moving another cam axially.

DESCRIPTION OF THE PREFERRED EMBODIMENT

Figure 5:
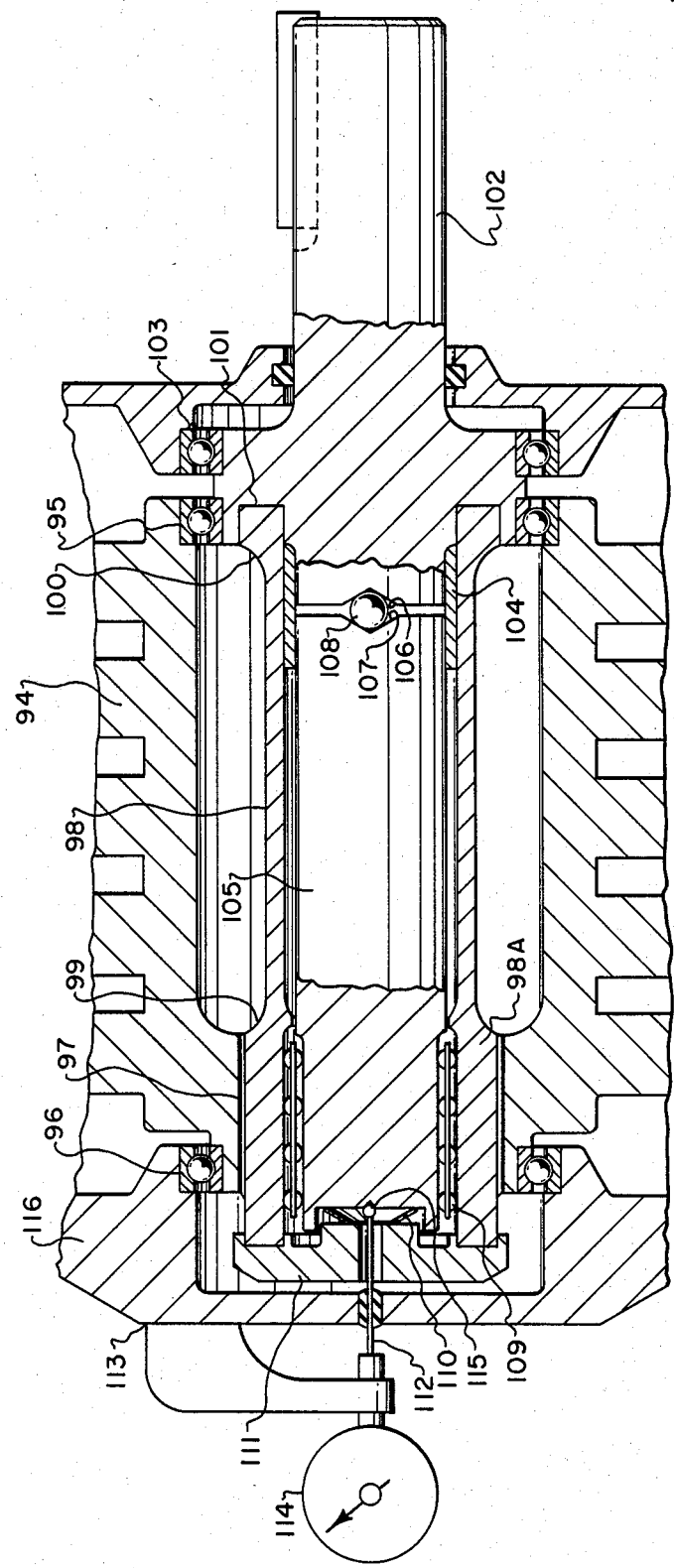
FIG. 5 is a fifth embodiment of the present invention.

Referring now to FIG. 1, reference numeral 1 identifies a torque sensitive shaft having an input end 2 and an output end 3 although the input could be applied to end 3 and the output taken from end 2 without changing the operation or function of the apparatus. The shaft 1 is supported by bearings 4 and 5 within a housing assembly defined by 6A, 6B, and 6C. The length of the torque sensitive shaft 1 between reference numerals 7 and 8 is defined as the torsion "windup" section of the device which twists in an angular sense in response to the torque which may be applied to the device. Member 9 is a disc shaped member fixedly attached to shaft portion 3 and has at its periphery, four equally spaced apart shaft stub elements 10 on which rollers 11 are located, operating on bearings 12. Concentrically located around the shaft element 1 is a tubular element 13 which has V-shaped cutouts 14 at one end. These cutouts act as cams or ramps on which the rollers 11 move such that when torque is applied, the angular movement of rollers 11 resulting from the torsion twist or angular windup of shaft element 1 causes rollers 11 to axially move ramps 14 proportionally causing a proportional axial movement of tubular member 13. Tubular member 13 is coupled at its other end to shaft portion 2 through annular member 15 and splines 16 which act to cause tubular member 13 to move in a rotational sense with torque sensitive shaft element 1 at the end 2 and also permitting free axial movement of tubular element 13 in relation to torque sensitive shaft element 1 as the rollers 11 move the ramps 14 in response to the torsional windup of the torque sensitive shaft 1 resulting from the applied torque. Spline elements 16 are illustrated as "ball splines" adapted to roll in axial grooves; however, other types of splines may be used. Spring elements 17 are positioned so that slight pressure exerted by the action of tubular member 13 is resisted only in a sufficient amount to cause the ramps 14 to bear against the roller elements 11 at all times.

A torque readout gauge is identified at 18. It is mounted or attached to housing assembly 6. The readout gauge 18 comprises a shaft element 18A, roller 19 and a spring 20. The particular type of gauge shown is only one type of gauge and it is to be understood that other types of gauges may be used that can pick up linear motion and translate the linear motion for readout that is calibrated so that the movement of its dial is proportional to the axial motion of tubular element 13 which is responding to the torque being applied to the apparatus resulting in torsion windup between 7 and 8 of the torque sensitive shaft. In the gauge shown, roller 19 is held against a ramp 21 and is reacting against member 22 on the opposite side of the ramp 21. Bearings 23 permit the free rotation of member 22 which turns in a direction opposite that of roller 19. As the tubular member 13 moves axially in response to the applied torque, the axial movement causes roller 19 and shaft element 18A to move inward toward the center of the meter or outwardly in response to decreasing or increasing torque respectively thereby moving the dial within the gauge 18 in such a way that the proportional movement of the gauge needle, as related to the calibrated scale thereon, results in an accurate measure of the torque being applied to the torque meter system. A spring 20 causes roller 19 to be pressed into contact with the axial moving ramp 21 at all times. With torque applied to either of shaft ends 2 or 3 either statically (shaft not rotating) or with shaft rotating, the torque thus applied causes angular twist of the shaft element 1 between 7 and 8. This angular motion causes the member 9 to move with the shaft end 3 causing rollers 11 to move angularly against the ramps 14 which are prevented from moving angularly with the shaft element 3 through the attachment of the tubular element 13 by spline elements 16 at the shaft end 3. As mentioned above, the other end of the tubular element 13 is attached to shaft end 2 with the use of spline elements 16 permitting the other end of the tubular element 13 to rotate with the shaft portion 2 and also permitting free axial movement of tubular element 13, and surface 21 against the spring 17 in response to the translation of torsional movement of rollers 11 into an axial movement of the ramps 14. With the roller element 19 and hence the shaft 18A responding to the movement of ramps 21 by moving inwardly or outwardly in response to the amount of torque being applied, gauge 18 is caused to provide a reading of torque. It is to be understood that other gauges may be employed rather than the gauge 18 for sensing the axial movement of sleeve 13. Other types of gauges or sensing systems may employ air gap sensing, fluid or hydraulic capsule sensing, magnetic sensing, the use of light or by use of electrical pickoff.

Referring now to FIG. 2, there will be described another embodiment of the torque meter of the present invention which may be placed in a line shaft where the torque meter is required to fit into a limited space but still yield a sensitive and accurate torque readout. The apparatus of FIG. 2 obtains a shorter length of torsional windup by the use of telescoping concentric shaft elements to increase the effective length of the torque sensitive elements. The input may be applied at 23 and the output taken off at 36. It is to be understood that the input could be applied at 36 and the output taken off at 23. It also does not make any difference in which direction the torque is applied. When the torque is applied, the first sensitive shaft section 24 which senses the torque through torsional windup is between 25 and 26. Shaft section 24 is tubular in shape. Inner shaft torque sensitive section 24 is fixedly joined to another shaft element 28 at 27. This torque sensitive shaft section is a tubular member which is part of the sensitive torsional windup shaft series with its critical torsional windup section existing between 29 and 30. Shaft 28 is fixedly jointed to another shaft 32 at 33. Shaft 33 is also a tubular member and has a sensitive torsional windup section between 37 and 38. At 34, shaft 32 is joined to member 35 from which the output shaft 36 extends. Member 34A is an annular member fixedly connected to member 35 and member 34B is a bearing. The total torsional angular windup of the torque meter with torque applied is a summation of the total torsional windup of the elements which in this instance is from 25 to 26 plus 29 to 30 plus 37 to 38. All of the sensitive shaft torsion sleeves may or may not all wrap up the same amount for a given torque per unit of length. It is to be understood that as many successive shafts may be used with as many torsion sensitive sleeve elements as may be required. The operation of the torque meter of FIG. 2 is similar to that of FIG. 1 in that it provides means for translating angular windup into axial motion or movement on a proportional basis in such a way that either from a static unit meter or a rotating unit meter, the amount of the axial translation of movement results in a transfer of the movement information to a pickup sensor mounted on a housing or adjacent to the torque meter. In FIG. 2 the torque meter is shown without being installed in its own housing. In this embodiment, the unit may be installed in a line shaft with the line shaft connecting at 23 and 36 thereby providing bearing support for the torque meter. The sensor information pickup will have a separate mounting (not shown). In addition, a frame (not shown) or platform on which the line shaft are mounted will provide support for the gauge sensing and pickup unit.

Formed on the end 34C of the annular element 34A are ramps 43 spaced as required around the torque meter. Sleeve 40 has ramps at the end next to element 34A. With the ramps aligned axially, balls or rollers 42 are located in the cavity as shown in FIG. 2A. When torque is applied to the torque meter, the resulting angular windup or twist in the length of the torque sensitive shaft sleeve elements causes ramps 43 to move in an angular sense causing the balls or rollers 42 to roll up the ramps 43 against the cam or ramp surfaces 41 thereby forcing or causing an axial movement to the ramp surfaces 41 formed in the sleeve 40. The other end of sleeve 40 is connected to an annular member 38. Sleeve 40 and ramps 41 are fixed against rotation with respect to shaft element 23 by spline elements 39 located in axial grooves formed between shaft 23 and annular member 38 which permit axial motion only between shaft 23 and sleeve 40. When the meter is under torsional load, the resulting axial movement of sleeve 40 is resisted by return springs 48 whose sole purpose is to hold the cam or ramp surfaces 41 against the balls or rollers 42 and hence hold the balls or rollers against the cam or ramp surfaces 43.

Surface 44 on the end of sleeve 40 is the gauging surface which provides an accurate and smooth platform for either a static or a rotational pickup for the roller element 45 which moves with the movement of sleeve 40. The axial displacement of sleeve 40 results in an axial motion being imparted to the element that supports roller 45 with the final result that the axial movement translates into a torque readout by instrument 47 which is calibrated so that movement of its dial is proportional to transmitted torque. Instrument 47 is coupled to roller 45 by way of member 46.

Referring now to FIG. 3, the torque member has an input shaft 49 and an output shaft 58. Shaft 49 drives a gear 52 which in turn drives an annular gear 53 with torque flow through torque sensitive shaft 54, which is tubular in shape. Shaft 54 drives annular member 57 which is connected to output shaft 58. As shown, torque sensitive shaft 54 connects gear 53 and annular member 57 together. It is to be understood that the input could be applied to shaft 58 and the output taken from shaft 49. Shaft 49 and gear 52 are mounted within a housing on bearings 50 and 51. Torque sensitive shaft 54 is mounted upon bearings 59 and 60 within the housing. Shaft 58 has a portion 61 extending back into the housing which terminates at a slanting cam surface 62. Located within members 53, 54, and 57 is a shaft element 64 having a slanting surface 63. In the nonoperating mode with no torque applied, surfaces 62 and 63 match each other as shown in FIG. 3A. Operationally as shown in FIG. 3B, surfaces 62 and 63 are displaced from each other in a rotary sense and in an axial sense surface 63 is caused to move member 64 axially. Surface 63 is caused to press against surface 62 of shaft portion 61 due to the action of springs 65 and 66. Shaft portion 64 is held in alignment with shaft element 61 by bearings 68 which permit free axial and rotational motion. At the other end ball splines 67 permit free axial motion of shaft 64 but prevents shaft 64 from turning with respect to member 53.

A gauge 69 is affixed to the torque meter housing at 70. It has a probe extension 71 which is centered in the end of shaft 64 at 72. The probe 71 is free to move in an axial sense with shaft member 64. An axial movement of element 71 is an index to the torque imposed on the torque meter with the motion translated into rotary movement on a dial 69 as torque value is read.

When torque is applied to the torque meter, a torsional windup occurs on torque sensitive shaft 54 between 55 and 56 which is the torque sensing portion of the meter. This torque windup causes shaft portion 61 to be displaced in a torsional sense with respect to shaft member 64 such that surface 62 rotates against surface 63 causing shaft 64 to move axially with surfaces 62 and 63 acting as cams. The resulting axial movement of shaft element 64 against spring 65 and 66 causes the instrument probe 71 to move which in turn causes gauge 69 to register a torque value by displacement in terms of axial movement which resulted from the torsional windup being translated into axial movement due to the action of the cam surfaces 62 and 63 responding to the torsional windup of torque sensitive shaft element 54.

The sensor probe 71 and the instrument 69 are shown as mechanical devices. Other systems for measuring the axial displacement of shaft member 64 may employ pneumatic air gap pickup sensing, magnetic sensing, optical sensing, hydraulics, or any combination of these techniques or means could be used.

Referring to FIG. 4, reference numeral 73 identifies an input shaft flange fixedly connected to input shaft 74. The output shaft is identified at 75 and is fixedly connected at 76 to an output flange 77. The torque sensitive portion 72 (which is tubular in shape) between shafts 74 and 75 senses torsional windup between 78 and 79. Member 81 comprises a hollow cylindrical portion 81A connected to a disc shaped portion 81B with four angular spaced apart webs 81C connected between member 81A and 81B. A ball spline 80 allows member 81 to move axially with respect to the shaft 74. A member 82 is fixedly connected to shaft 75 by the flange 77. Member 82 comprises a hollow cylindrical shaped member 82A connected to a disc shaped member 82B. Four angularly spaced apart webs 82C are connected between cylindrically shaped member 82A and disc shaped member 82B. Disc shaped members 81B and 82B have four angularly spaced apart cam ramps 83 and 84 respectively which are adapted to engage each other as shown in FIG. 4 and FIGS. 4A and 4B. In FIG. 4, the ramps 83 and 84 are shown in a non-torque position. In FIG. 4A, the ramps are shown with torque applied to the system in one direction. In FIG. 4B, the ramps are shown with torque applied in the opposite direction.

Shaft 74, torque sensitive portion 72, and shaft 75 have apertures 74A, 79A and 75A formed therethrough defining a single aperture. Member 85 is fixedly connected to a rod 86 which extends through an aperture 74B formed transversely through the shaft 74. Thus as the shaft 74 turns, member 85 turns with the shaft element 74. A rod 88 is attached to member 85 and extends through apertures 74A, 79A and 75A. Rod 86 can move a short distance within aperture 74B along the axis of shaft 74 whereby members 85 and 88 may move axially the same distance within aperture 74A, 79A, and 75A. Rod 86 bears against an annular ring 87 which is connected to the top portion of the cylindrical portion 81A of member 81. Rod 88 ends in element 91 projecting outward of shaft 75. Reference numerals 89 and 90 identify springs which bear against element 91 and a disc member 91A having an aperture 91B formed therethrough through which the rod 88 freely extends. Member 92 is a sensor probe extending from a dial gauge meter probe which is part of a readout meter 93.

With torque applied at 73 whether from a line shaft, a lever, etc., the torsional windup will take place between 78 and 79 on the torque sensitive shaft element with the torque transmitted through and to flange 77. Flange 77 may be part of the line shaft, an offset drive, a lever system, etc. It is to be understood that flange 77 could be the input and flange 73 could be the output.

With torque applied at either shaft end 73 or 77, the angular wrap or windup occurs in the torque sensitive portion of the central shaft between 78 and 79. When this occurs, cam surfaces 84 being attached to the shaft 75 which is being torqued and which lags in an angular sense behind the shaft portion 79 due to torsion windup, the cam surfaces 84 will move differentially with respect to member 81 and cam surfaces 83 thereby causing an axial movement to be imparted to the member 81. Ball splines 80 permit free axial movement between shaft 74 and member 81 so that the member 87 bears against rod 86 moving member 85 and rod member 88 axially. This causes a movement of element 91. When this takes place, element 92 will extend or retract, for increasing or decreasing torque, so that the instrument sensor probe 92 moves the dial of the gauge 93 thereby yielding torque readout on the dial. The angular differential movement of the cam surfaces 83 and 84 due to torsion applied to the meter, results in a proportional axial motion or movement of member 81 which is translated into axial motion through rod 88 to probe 92 which registers such movement on the dial of the gauge 93 which is calibrated to give a readout in torque units.

Other types of gauges could be employed to sense the axial displacement of rod 88 as can be understood from the above identified descriptive matter.

Referring now to FIG. 5, the embodiment shown may be installed internally within a main shaft of a hydraulic or electric motor, or a power shaft where the main power output shaft drive would be on the end opposite to the placement of the gauging devices. In FIG. 5, the rotor of the motor supplying the power is identified at 94. It could be defined as the power shaft and is mounted upon bearings 95 and 96. Shaft 94 is joined at 97 to a tubular inner shaft 98 which is the torque sensitive shaft element of the system. Angular windup of the torque sensitive shaft is between 99 and 100. At 101, the torque sensitive shaft is joined to an output shaft element 102 which is supported in bearings 103. Element 104 is a guide that centers an axially located shaft 105.

The rear portion of shaft 102 has ramp surfaces 106 such that the ramp surfaces 106 rotate with the shaft 102. Shaft 105 has ramp surfaces 107. Balls 108 are located between the ramp surfaces 106 and 107. Surfaces 106 and 107 and balls 108 function in the same manner as surfaces 43 and 41 and balls 42 of FIGS. 2, 2A, and 2B respectively. Shaft 105 is supported on an axial spline at 109 which causes shaft 105 to rotate with power shaft 94 and torque sensitive element 98, but leaves shaft 105 free to move axially being opposed by a spring 110. Spring 110 is held captive by element 111 causing the spring 110 to oppose by a small force the axial movement of shaft 105 resulting in the torsional windup when torque is applied to the system as reflected into shaft 105. A gauge probe 112 extends from a gauge 114 and is placed in contact with end 115 of the axial movable shaft 105. The gauge is attached to the motor frame 116 at 113.

In operation, rotary power is applied by element 94 causing a torsional twist or angular windup of the torque sensitive shaft element 98 between 99 and 100. With shaft 105 fixed rotationally at 109 with respect to the end 98A of shaft 98 and with the torsional angular windup ending at 100, to which the cam surfaces or ramps 106 are fixed, the torsional angular twist causes cam surfaces 106 and 107 to be displaced from each other in an angular sense, thereby causing balls 108 to roll up the ramps of the cam surfaces 106 and 107. This causes shaft 105 to move axially. Since shaft 105 is fixed rotationally at its other end with respect to end 98A and with spring 110 bearing against surface 115, surface 115 is caused to move instrument probe 112 causing dial 114 to provide a gauge display of the torque. Gauge or dial 114 thus relects a proportional movement in accordance with the angular windup of the torque sensitive element 98 which is reflected by the cam surfaces into an axial movement of shaft 105. The angular torsional windup is a true measure of the torque imposed on the system by the power shaft element 94 and through the action of the cam surfaces 106 and 107 and balls 108, the resulting torsional angular movement is translated from a torsional mode and angular movement into an axial movement by and through the action of the cam surfaces 106, 107, and balls 108 with the axial movement imposed on the shaft 105. The movement of shaft 105 thus is reflected into a movement axially upon the end of the instrument probe 112 which causes a proportional movement to be registered upon the torque readout gauge 114.

As can be understood from the above identified description, other means could be employed for measuring the amount of axial movement of shaft 105 such as electrical means, magnetic means, air gap sensing, the use of light or optics, or hydraulic means, etc.

I claim:
1. An apparatus for measuring torque, comprising:
first and second shaft means spaced axially from each other,
said second shaft means having an aperture formed therethrough,
a tubular torque sensitive means connected between said first and second shaft means,
axially movable means located within said aperture and within said tubular torque sensitive means and having a first end coupled to said first shaft means,
first cam means coupled to said first shaft means,
means for allowing said first cam means to move axially relative to said first shaft means,
second cam means connected to said second shaft means,
said first and second cam means having first and second surfaces respectively engaging each other for causing said first cam means to move axially when torsion of said tubular torque sensitive means occurs upon the application of torque to one of said shaft means,
means coupling said first cam means to said axially movable means for causing said axially movable means to move axially when said first cam means moves axially,
and means for measuring the axial displacement of said axially movable means.

2. An apparatus for measuring torque, comprising:
first and second shaft means located axially relative to each other,
said first shaft means having a torque sensitive portion between first and second opposite ends,
said second end of said first shaft means being located closer to said second shaft means than said first end,
a first tubular torque sensitive means having first and second opposite ends,
said first tubular torque sensitive means surrounding first shaft means and having its first end connected to said second end of said first shaft means,
a second tubular torque sensitive means having first and second opposite ends,
said second tubular torque sensitive means surrounding said first tubular torque sensitive means and having its first end connected to said second end of said first tubular torque sensitive means,
said second end of said second tubular torque sensitive means being connected to said second shaft means,
axially movable means surrounding said second tubular torque sensitive means,
said axially movable means having a first end coupled to said first end of said first shaft means allowing said axially movable means to move axially relative to said first shaft means,
means coupled to said second shaft means for engaging the other end of said axially movable means for causing said axially movable means to move axially relative to said first shaft means when torsion of said torsion sensitive portions of said first shaft means, of said first tubular torque sensitive means, and of said second tubular torque sensitive means occurs upon the application of torque between said first and second shaft means, and
means for measuring the axial displacement of said axially movable means.

3. An apparatus for measuring torque, comprising:
a tubular shaft means having first and second ends with a torque sensitive portion therebetween,
first tubular means surrounding a portion of said tubular shaft means,
said first tubular means being coupled to said first end of said tubular shaft means for axial movement relative to said first end of said tubular shaft means,
axially movable means located within said tubular shaft means and coupled to said first tubular means for axial movement therewith,
second tubular means surrounding a portion of said tubular shaft means,
said second tubular means being connected to said second end of said tubular shaft means,
said second tubular means comprising cam means for moving said first tubular means axially relative to said tubular shaft means when torque is applied between said first and second ends of said tubular shaft means thereby causing said axially movable means to move axially within said tubular shaft means, and
means for measuring the axial displacement of said axially movable means.

* * * * *